F. A. NEVEU.
ELBOW PIPE JOINT.
APPLICATION FILED MAR. 19, 1913.
1,077,741.
Patented Nov. 4, 1913.
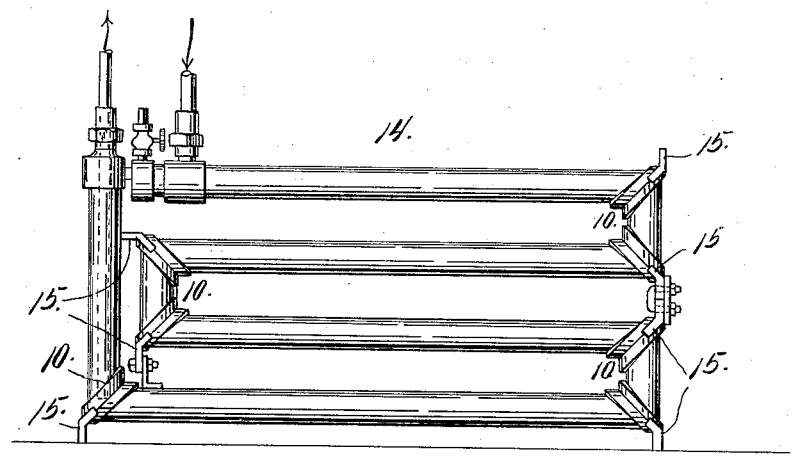
Fig. 1
Fig. 2
Fig. 3
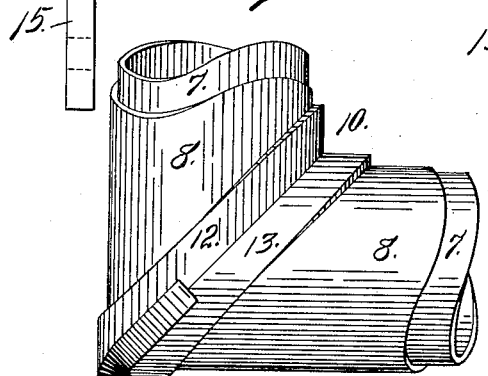
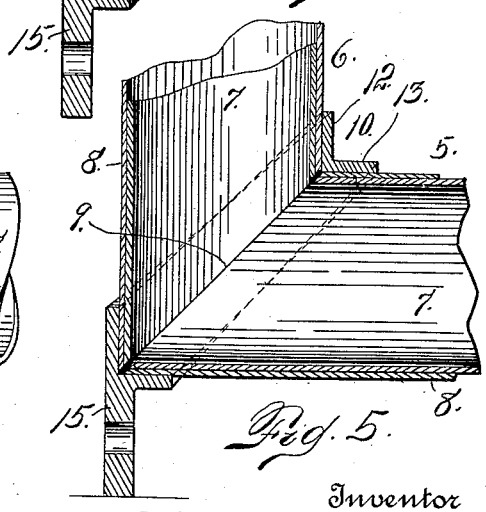
Fig. 4
Fig. 5
Witnesses
Otto E. Hoddick.
Lawrence E. Petersen.
Inventor
Frank A. Neveu.
By
Attorney

UNITED STATES PATENT OFFICE.

FRANK A. NEVEU, OF DENVER, COLORADO.

ELBOW PIPE-JOINT.

1,077,741. Specification of Letters Patent. Patented Nov. 4, 1913.

Application filed March 19, 1913. Serial No. 755,361.

*To all whom it may concern:*

Be it known that I, FRANK A. NEVEU, a citizen of the United States, residing in the city and county of Denver and State of Colorado, have invented certain new and useful Improvements in Elbow Pipe-Joints; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in elbow pipe joints, more especially adapted for use in iceless soda coolers. Heretofore, so far as I am aware, in the construction of the elbows of these pipes, a solid elbow has been formed out of block tin and the two pipe members applied exteriorly thereto and soldered. This construction is quite expensive, while at the same time the elbow composed of a single thickness of block tin is weak and not sufficiently substantial, considering the pressure to which it is subjected.

The object of my present invention is to overcome this difficulty and to this end I form the elbow joint in a manner similar or substantially the same as what is known as the "miter joint" in carpentry. Hence, the two pipe members are connected on a line bisecting the right angle formed by the two pipe members or on a line forming an angle of 45 degrees with the vertical. The joint thus formed is exteriorly reinforced by an angle shaped ring which overlaps the joint on both sides, the said ring being in close contact with the pipe members constituting the elbow. This ring is soldered exteriorly to the pipe members, thus producing a structure of great strength and in every way suitable for the purpose intended. This reinforcing ring, by virtue of the fact that it is exteriorly located and not exposed to the liquid which passes through the pipes of the cooler, may be formed from any suitable metal, as brass, which has much greater strength than the block tin which has been employed in constructing these iceless coolers heretofore so far as I am aware. The necessity for making the elbow of block tin in the old form of construction resides in the fact that brass or other durable metals cannot be employed since the liquid passing through the cooler comes in contact therewith, resulting in corrosion.

Having briefly outlined my improved construction, I will proceed to describe the same in detail with reference to the accompanying drawing in which is illustrated an embodiment thereof.

In this drawing: Figure 1, is an elevation of a cooler showing my improvement in use. Fig. 2 is a detail elevation of the reinforcing angle ring forming a part of my invention. Fig. 3 is a sectional view of the same. Fig. 4 is an enlarged view of an elbow formed by means of my improvement. Fig. 5 is a sectional view of the same.

The same reference characters indicate the same parts in all the views.

Let the numerals 5 and 6, respectively, designate the two pipe members forming the elbow joint after the manner of my invention. These two pipe members are each composed of an inner pipe 7 and an outer pipe 8. This feature, however, is not novel and hence nothing is claimed thereon. The two members 5 and 6 are so fashioned that their extremities when brought together to form the elbow joint engage in the plane of a line 9, which forms angles of 45 degrees with the vertical and horizontal. The meeting extremities of the two pipe members are preferably soldered together, the solder being applied to each member previous to the insertion of the members in an angle ring 10, in which the two pipe members fit closely, the angle ring having parts 12 and 13, which respectively overlap the pipe members on opposite sides of the plane of the joint. The angle ring 10 is then securely soldered to the two pipe members, affording a joint of great strength and security, as heretofore stated.

In order to support the cooler, which may be designated in its entirety by the numeral 14, (see Fig. 1) and in order to connect the various pipe sections constituting the cooler with each other, my improved angle ring is equipped with projections 15, which extend from the elbow sufficiently for the purpose. The use of these projections is clearly illustrated in Fig. 1. In the lower part of this view, the projections constitute legs or supports for the cooler. Above the lowermost pipe section, the said projections are employed to connect the pipe members to each other. It is thought that the illustration is so plain that further explanation will not be required.

From the foregoing description, the use and advantages of my improved construction will be thoroughly understood and further detailed explanation is therefore thought unnecessary.

I claim—

1. The combination of two pipe members having their extremities beveled and fitted together to form an elbow and a reinforcing band applied exteriorly thereto, the said band being angular in cross-section to conform to the angular relation of the pipe members, and equipped with a projection constituting a support for the purpose set forth.

2. A soda-fountain cooler composed of pipe sections connected by elbow joints formed by placing the beveled extremities of the pipe in abutting relation, and an exterior reinforcement for said extremities, the said reinforcements having projections to facilitate the connection and support of the cooler members substantially as described.

In testimony whereof I affix my signature in presence of two witnesses.

FRANK A. NEVEU.

Witnesses:
A. J. O'BRIEN,
ANNA LOUISE LEHMAN.

Copies of this patent may be obtained for five cents each, by addressing the "Commissioner of Patents, Washington, D. C."